Oct. 20, 1959 K. L. JOHNSON 2,909,205
WELD-LOCK NUT
Filed Dec. 29, 1955
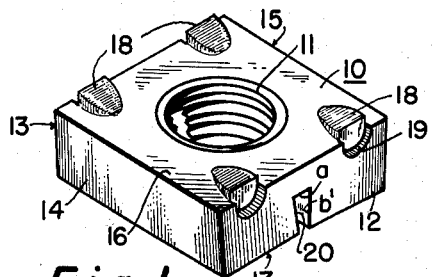
Fig. 1
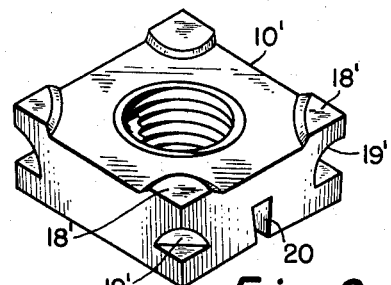
Fig. 2
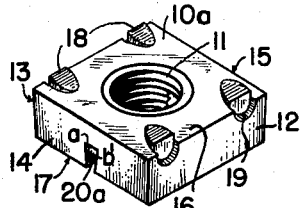
Fig. 1A
Fig. 3
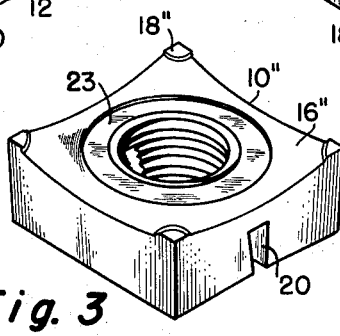
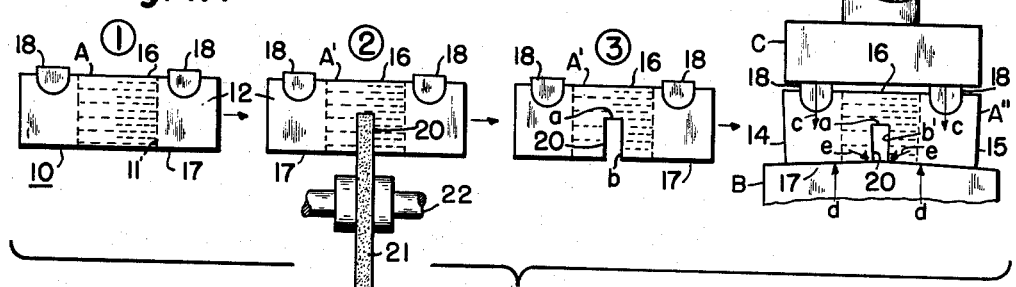
Fig. 4
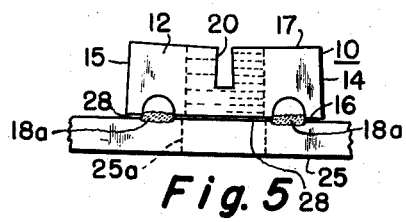
Fig. 5
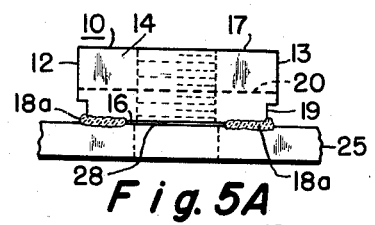
Fig. 5A
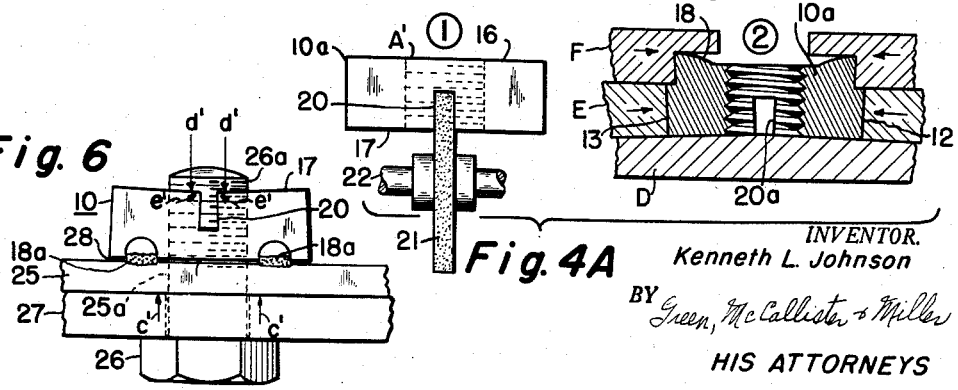
Fig. 6     Fig. 4A
INVENTOR.
Kenneth L. Johnson
BY Green, McCallister & Miller
HIS ATTORNEYS

United States Patent Office 2,909,205
Patented Oct. 20, 1959

2,909,205

WELD-LOCK NUT

Kenneth L. Johnson, Edinboro, Pa.

Application December 29, 1955, Serial No. 556,204

3 Claims. (Cl. 151—21)

This invention relates to fasteners in the nature of weld nuts and particularly to a locking type of weld nut.

Although I have been able to provide a practical form of locking nut for general usage that employs a flexible or resilient thread-root insert of nylon or other suitable plastic material, difficulty has been encountered in employing this type where the nut or the assembly is to be subjected to heat. It is apparent that considerable heat is generated, even if momentary, in welding a weld nut to its metal sheet, plate or strip. Weld nuts have received wide acceptance for use in assemblies that may have one or more inaccessible sides and for somewhat general usage in sheet and strip metal assemblies.

A rather expensive so-called Marsden type of lock nut has been devised that requires a minimum thickness or depth of at least 25% higher than a trade-designated extra-thick nut or of about 50% higher than a standard nut. It employs a special shape having an end mount, integral top extension or collar portion that is provided with about three cross-slits. Lugs thus provided may be pushed-in towards the threaded center of the nut about .002 to .003 of an inch as an absolute limit. Also, the locking set-in is relatively short as it is limited to the top extension portion. The maximum pitch diameter reduction in the threads is about .005 of an inch.

Thus, it is an important object of my invention to develop a type of locking nut that will be practical and inexpensive and, at the same time, that will not be adversely affected by heat such as a welding heat;

Another object has been to provide a solution to the problem of providing a weld-lock nut;

These and other objects of my invention will appear to those skilled in the art from the drawings and the following description.

In the drawings,

Figures 1, 2 and 3 are perspective views on the same scale showing weld nuts constructed or modified to employ my invention;

Figure 1A is a reduced perspective view showing a weld nut similar to the nut of Figure 1, but with its lock groove extending at right angles to that of the nut of Figure 1;

Figure 4 is a somewhat diagrammatic side view in elevation on a reduced scale and showing a procedural or operative lay-out and steps employed in making a lock-weld nut in accordance with my invention;

Figure 4A is a view on the scale of and similar to Figure 4, but illustrating a simplified procedure or operative layout that may be employed in making a nut such as exemplified in Figure 1A;

Figure 5 is a side view in elevation on the scale of Figure 4 and showing a complete lock-weld nut assembly as applied to a backing member and employed in accordance with my invention;

Figure 5A is a view similar to Figure 5 but taken at right angles thereto;

Figure 6 is a side view in elevation on the scale of Figures 4, 5 and 6, showing how the assembly of Figure 5 may be secured in position by a bolt element and illustrating force distribution that may take place when the bolt element is tightened-down.

My invention now makes it possible and practical to use a nut construction 10 that is made from a metal blank consisting of standard nut stock and that is standard as to its central axially-extending threaded bore, its thickness or side wall extent, as to its general dimensions, and as to its top and bottom faces, etc. However, such a standard nut is provided with welding projections on its top face that project outwardly beyond its top surface and that are located in a position-balanced relation about it and adjacent top portions of its sides or corner edges.

As shown particularly in Figure 5, the nut is secured in position to a transverse or lateral backing member 25 of tensile metal such as steel at its top or weld-lug projection-carrying side 16, so as to form an integral structure or assembly and to provide a hollow or offset spaced relationship (slight spacing 28) between the member and portions of the top face of the nut which lie adjacent to or about its threaded axial center. As a result, as shown particularly in Figure 6, final bolting or tightening-down forces are applied essentially to the outer or peripheral portions of the top or end face of the nut and in such a manner as to cause lower side wall portions to be urged with increasing force somewhat diagonally-inwardly (see e') as a bolt 26 is tightened-down. This increases rather than decreases the locking action of the nut with respect to the bolt.

In accordance with my invention, the opposite or lower end face 17 of the nut 10 is provided with a cross-slot, mouth or slit portion 20 that extends from and through opposite sides of the nut, across its narrowest transverse or waist portions (between its sides and its central bore), in a spaced relationship between welding lugs or projections 18, and into and across its threaded bore portion 11. This transverse slot 20 is formed opposite to the above-mentioned depth spacing that is located between a central area of the other end face 16 of the nut. It is thus oppositely-positioned with and substantially perpendicular to a substantially parallel plane defined by apices or projections of weld lugs such as 18.

This slot 20 will have a depthwise extent from an optimum standpoint of about 60% of the total depth or thickness of the nut. Such a cut may destroy about 70% of the lateral strength of the nut. However, after the nut has been secured as an integral part of a metal backing member 25 by welding its welding projections or lugs thereto, I have determined that the lateral strength is increased up to about 80% or 90% of its original value in the nut. The cut is made at the shortest section of the nut and to provide requisite flexibility of locking action to a depth of at least 50% of the depth of the nut. In this manner, a pair of spread and close locking segments or halves are provided from the bottom end face 17 of the nut which are connected together by a transverse thickness portion lying adjacent to the opposite end face 16. The flexibility and strength of the latter portion is determined by the depth-extent of the mouth or slot 20. For additional flexibility where lateral strength requirements may be lower, the cut may be extended up to 75% of the depth or thickness.

This method gives greater resiliency and flexibility of locking action and, in effect, restores lateral strength while at the same time retaining such resiliency as to the completed assembly. An 80% to 90% restoration on a 60% depth of cut may be obtained by using a thickness of metal backing sheet 25 of about .030 of an inch. In this connection, the member 25 does not have to be flexible as flexibility is provided in the two halves or integrally-connected parts of the nut, itself.

This construction eliminates non-metallic material which is damaged by heat and provides a much greater resiliency in locking action. As employed, the nut tends to increase its locking action instead of decreasing it by forcing the threads out on parallel planes, as is a natural tendency when a bolt is tightened-down. It has a set-in length of travel greater than possible with other lock nuts and such that it can span commercial tolerances of commercial bolt pitch diameters.

After a pair of opposed and substantially parallel slit mouth lips *b* have been formed to project transversely across the narrow extent of the opposite end face 17 of the nut 10, or in other words, after a cutting or slitting operation, the lower side or end portions of the nut are pressed or bent-in to move the lips slightly towards each other and into downwardly or outwardly-converging inclined planes. By this method, the pitch diameters of the top threads of the nut are reduced by about .020 of an inch whereas, in an ordinary lock nut, the reduction is about .005 of an inch. The depth of cut minimizes the force required to insert or remove one part such as a bolt from the other part or nut of a self-locking joint assembly.

Referring to the drawings and particularly to Figures 1 and 4, I have shown a weld nut 10 having welding projections 18 that has been produced in accordance with the invention of my co-pending application Serial No. 148,835, filed March 10, 1950, and entitled "Weld Nut." This application is a continuation-in-part of my copending application Serial No. 148,835. Incidentally, this is also true of the slightly modified type of nut shown in Figure 2.

In Figure 1, 10 indicates a complete lock-weld nut before it has been secured to or assembled with a backing plate or member 25 of steel of some bend-flexibility, as disclosed in Figures 4, 5 and 5A. As shown, the nut 10 has a centrally-threaded bore 11 therethrough of a standard metal nut which is open to its generally flat and substantially parallel opposed top (outer) and bottom (inner) end faces or surfaces 17 and 16 and which extends in a substantially perpendicular and parallel relationship with respect to vertical generally flat and substantially parallel side walls 12, 13, 14 and 15. The opposed vertical side walls 14 and 15 tend to slightly converge or slope inwardly-downwardly towards the end face 17 from the vertical or perpendicular, due to a bending or pressing-in step, see (4) of Figure 4. Equal-height weld projections 18 are provided on the upper face 16 with suitable flash pockets 19. In the completed assembly, as shown in Figure 5, these projections (indicated in an as-welded condition as 18a) secure the nut 10 on a substantially flat plane to the metal backing member sheet or plate 25 to define an annular area or slightly offset space 28 (see Figures 5 and 5A) about the axial center or thread portion 11 of the nut and remote from its outer peripheral or bounding corners and edges.

In the nut construction 10' of Figure 2, I have indicated similar but slightly modified portions by prime affixes. In this connection, the weld projections 18' and the flash pockets 19' are upset immediately at the corners of the nut instead of near the corners at top edges, as shown in Figure 1. In the nut 10" of Figure 3, weld projections 18" are provided on a slightly inwardly-concave upper end face 16".

In making a nut in accordance with my invention, I first start out with a suitable standard tapped nut blank, then form weld projections, as shown in (1) of Figure 4. In the next step, a transverse slit or slot 20 is then cut, formed or provided along the outer or upper end face 17 of the nut, by suitable means such as a cutter wheel 21 and drive shaft 22, see (2) of Figure 4. After this operation, the general shape of the nut has been changed from the shape of A of (1) to the shape of A' of (2) and (3).

Vertical or opposed sides *b* of the lips thus provided are substantially parallel or planar in A' and thus, lie at substantially right angles or are perpendicular to a base portion *a* of the recess or slot 20. However, when the nut is subjected to the operation of (4) of Figure 4, it attains the shape A" wherein, its side portions 14 and 15 now tend to slope or converge inwardly and in a somewhat diagonal direction towards the upper end face 17. This operation may be accomplished, as shown, by employing a press consisting of a base B and a plunger C. As shown, the plunger C contacts the weld projections 18, thus concentrating compressing action on the nut at its outer edges, as indicated by the arrows *c*, and as opposed by the base part B and its force action *d*. The resolution of the forces thus applied is somewhat diagrammatically indicated by slant arrows *e* and which, as shown, result in lip edges *b'* which have a downward convergence towards each other from the base portion *a* of the slot or recess provided toward the end face 17. The product produced is indicated as A".

In Figures 5 and 6, a weld nut such as the nut 10 has been shown secured in position on the backing member, piece or part 25 to form a complete assembly. Such an assembly sets up forces, as indicated by the arrows *c'*, *d'* and *e'* of Figure 6, when a bolt 26 having a threaded stem 26a is tightened-down in position between the backing member 25 and a base mounting portion such as 27. First, the threading of the nut assembly on the bolt 26 causes the nut 10 to flex transversely or sidewise-outwardly to slightly spread the lips of the mouth or slotted portion 20 and cause the two halves or side segments of the nut to flex transversely-outwardly along the end thickness portion that lies along the opposite end face 16. Then, the final tightening-down tends to cause the force action above-mentioned to, as shown in Figure 6, apply force (see arrows *e'*) that aids the normal tendency of the nut 10 to slightly close its mouth in a transverse direction and upon the bolt stem 26a. It is apparent that the resolution of forces of part (4) of Figure 4 is followed-out when a bolt is tightened-down on the assembly to thus further enhance or increase the locking action of the assembly.

In the nut 10" of Figure 3, where weld projections 18" and annular groove or inwardly-offset band 23 may be formed by vertical upsetting dies, the groove 20 may be substantially simultaneously toed or pushed-in in a manner similar to step (4) of Figure 4. It will be noted that the offset band 23 provides an effective space 28 for assuring the locking action of Figure 6, irrespective of whether or not a slope is provided on the surface 16"', for example.

In Figure 1A, nut 10a is a preferred construction utilizing my invention. As shown, the weld projections 18 have their positions of entry on opposite sides 12 and 13, while its mouth or slot 20a is entered from opposite sides 14 and 15. Thus, the mouth portion 20a extends substantially at right angles to the weld projections 18, to the sides 12 and 13 on which they are formed, and to planes of extension of opposed pairs of the weld projections. An advantage of the construction of Figure 1A is illustrated by the simplicity of the forming procedure of Figure 4A.

In step (1) of Figure 4A (which corresponds somewhat to step (2) of Figure 4), a standard nut A' is subjected to the action of a milling or cutting wheel 21 to form a substantially rectangular slot, groove or mouth 20. Thus, the nut shape A' of (1) of Figure 4A now corresponds to the shape of A' of (3) of Figure 4, except that no weld projections have been formed. In step (2) of Figure 4A, the grooved or slotted nut shape of (1) is now both provided with weld projections 18 and with toed, bent or pressed-in locking halves or segments. The latter segments extend from the top end 17 of the nut 10a and along its sides 12 and 13. The product produced is shown in Figure 1A.

In step (1) of Figure 4A, opposed dies F are employed to move laterally-inwardly in the direction of the arrows to strike-up oposed pairs of weld projections 18 and flash pockets 19. A lower set of opposed dies E are operatively positioned for lateral-inward movement between upper dies F and a base D. The base has upwardly-sloped surfaces on which the dies E advance in the direction of the arrows to push or toe-in the nut shape towards its upper face or end 17 and complete the locking slot portion 20a. The front or pushing-in face of each die E declines slightly inwardly-downwardly in a lateral or radial direction towards the end face 17 of the nut. The slope of the base member D is such that its apex lies substantially in alignment with and beneath an axial or lateral center line along the slot 20a. The dies E may be moved in simultaneously with but preferably slightly ahead of the dies F, in order to hold the nut in position while the weld projections are being formed.

What I claim is:

1. A weld-lock nut of the character shown and described comprising, substantially vertical side walls having substantially vertical side ends, an upper substantially planar end portion to be welded on a support member, a lower end portion, and a threaded bore extending centrally therethrough at substantially right angles with respect to the upper end portion, a plurality of said side walls being flat, a plurality of welding projections and flash pockets formed by displacement of portions of the material of the nut adjacent the intersection of said substantially planar end portion and said flat walls, said welding projections and flash pockets being formed in substantial symmetry about a plane which is perpendicular to one of said flat walls and includes the axis of threaded bore, each said welding projection and flash pocket being spaced from the side ends of one of said flat walls and defined by a vertically-outer welding face sloping upwardly and outwardly from said planar end portion and terminating in an apex straight edge spaced above and inwardly of the adjacent flat wall and being substantially parallel to the adjacent one of said intersections, a substantially planar outer side face sloping downwardly and slightly inwardly from said apex straight edge, a recessed surface substantially perpendicular to said adjacent flat wall, said recessed surface extending downwardly from said substantially planar end portion and forming a boundary of the lower portion of said planar outer side surface, each said apex straight edge lying in a common plane parallel to said planar end portion and forming the uppermost portion of said nut, a transversely-extending slot formed in said lower end portion and extending across the weld nut in a plane which is perpendicular to one of said flat walls and includes the axis of said threaded bore.

2. A weld-lock nut as defined in claim 1 wherein said transversely-extending slot extends upwardly within said lower end portion to a height of up to about 75% of the height of said substantially vertical side walls.

3. A weld-lock nut as defined in claim 1 wherein said transversely-extending slot uniformly diverges upwardly along its extent within said lower end portion.

References Cited in the file of this patent

UNITED STATES PATENTS

| 219,783 | Vaughan | Sept. 16, 1879 |
| 792,884 | Eicher | June 20, 1905 |
| 1,734,445 | Place | Nov. 5, 1929 |
| 2,054,187 | Almdale | Sept. 15, 1936 |
| 2,073,467 | Demboski | Mar. 9, 1937 |
| 2,167,285 | Smith | July 25, 1939 |
| 2,179,398 | Briggs | Nov. 7, 1939 |
| 2,286,982 | Todd | June 16, 1942 |
| 2,300,619 | Double | Nov. 3, 1942 |
| 2,335,593 | Howe | Nov. 30, 1943 |
| 2,385,991 | Huntoon | Oct. 2, 1945 |
| 2,461,097 | Wallace | Feb. 8, 1949 |
| 2,612,647 | Howe | Oct. 7, 1952 |
| 2,709,469 | Tripp | May 31, 1955 |

FOREIGN PATENTS

| 907,759 | France | July 23, 1945 |
| 120,411 | Australia | Sept. 25, 1945 |